(12) United States Patent
Hashimoto et al.

(10) Patent No.: US 7,480,410 B2
(45) Date of Patent: Jan. 20, 2009

(54) IMAGE RECOGNITION METHOD AND APPARATUS FOR THE SAME METHOD

(75) Inventors: Yoshihito Hashimoto, Osaka (JP); Kazutaka Ikeda, Nara (JP)

(73) Assignee: Matsushita Electric Works, Ltd., Kadoma-shi (JP)

( * ) Notice: Subject to any disclaimer, the term of this patent is extended or adjusted under 35 U.S.C. 154(b) by 923 days.

(21) Appl. No.: 10/466,765

(22) PCT Filed: Nov. 28, 2002

(86) PCT No.: PCT/JP02/12470

§ 371 (c)(1),
(2), (4) Date: Jul. 31, 2003

(87) PCT Pub. No.: WO03/046807

PCT Pub. Date: Jun. 5, 2003

(65) Prior Publication Data

US 2004/0071345 A1 Apr. 15, 2004

(30) Foreign Application Priority Data

Nov. 30, 2001 (JP) .............................. 2001-367675

(51) Int. Cl.
*G06K 9/18* (2006.01)
*G06K 7/00* (2006.01)
(52) U.S. Cl. ....................................... 382/182; 382/187
(58) Field of Classification Search .................. 382/36, 382/15, 156, 187, 177, 19, 115, 159, 165, 382/170–171, 180–182, 209, 217, 229, 238, 382/240, 282, 284, 289; 600/109; 358/462; 356/29

See application file for complete search history.

(56) References Cited

U.S. PATENT DOCUMENTS 5,048,100 A * 9/1991 Kuperstein .................... 382/36

(Continued)

FOREIGN PATENT DOCUMENTS

EP 0 907 140 4/1999

(Continued)

*Primary Examiner*—Samir A. Ahmed
*Assistant Examiner*—Mehdi Rashidian
(74) *Attorney, Agent, or Firm*—Oblon, Spivak, McClelland, Maier & Neustadt, P.C.

(57) ABSTRACT

An image recognizing method is provided, which includes the capability of efficiently recognizing characters such as letters and numerical characters included in an original image with accuracy when at least one of the characters is composed of plural elements. In this method, the elements in the original image are extracted to obtain a second image, in which each of the elements is enclosed by a rectangular frame. Then, a composite image is prepared with respect to a combination of the rectangular frames in the second image. After calculating a characteristic amount of the elements included in the composite image, the characteristic amount is input in a back-propagation network, in which learning about a reference character(s) to be included in the image has already finished, so that a degree of agreement between the characteristic amount of the composite image and the reference character is obtained. The composite image having a highest degree of agreement therebetween is determined from results provided by the back-propagation network with respect to different combinations of the rectangular frames in the second image, to output it as a recognition data.

11 Claims, 7 Drawing Sheets

U.S. PATENT DOCUMENTS

| | | | |
|---|---|---|---|
| 5,151,951 A * | 9/1992 | Ueda et al. | 382/19 |
| 5,542,006 A * | 7/1996 | Shustorovich et al. | 382/156 |
| 5,633,954 A * | 5/1997 | Gupta et al. | 382/187 |
| 5,644,648 A * | 7/1997 | Bose et al. | 382/177 |
| 6,041,141 A | 3/2000 | Maekawa et al. | |
| 6,212,299 B1 | 4/2001 | Yuge | |

FOREIGN PATENT DOCUMENTS

| | | |
|---|---|---|
| EP | 0 949 580 | 10/1999 |
| EP | 1 089 214 | 4/2001 |
| GB | 2 343 045 | 4/2000 |
| JP | 62-190574 | 8/1967 |
| JP | 59-91582 | 5/1984 |
| JP | 59-180783 | 10/1984 |
| JP | 60-153574 | 8/1985 |
| JP | 61-29982 | 2/1986 |
| JP | 62-223890 | 10/1987 |
| JP | 2-310782 | 12/1990 |
| JP | 5-174187 | 7/1993 |
| JP | 6-180771 | 6/1994 |
| JP | 7-175894 | 7/1995 |
| JP | 8-212290 | 8/1996 |
| JP | 9-305710 | 11/1997 |

* cited by examiner

IMAGE RECOGNITION METHOD AND APPARATUS FOR THE SAME METHOD

TECHNICAL FIELD

The present invention relates to an image recognition method for efficiently recognizing characters such as letters, numerical characters and symbols with accuracy even from an unclear image or an image including noises, and an apparatus for the same method.

BACKGROUND ART

In the past, it has been performed to recognize letters in an object image by comparing the object image with a reference image stored in a memory. For example, as disclosed in Japanese Patent Application [kokai] No. 8-212290, there is a method of identifying letters included in an original image, which comprises the steps of binarizing the letters to be identified, performing a normalization treatment to the obtained binary image, and inputting the normalized data into a neural network. According to this method, it is possible to accurately identify letters and/or numerical characters even from a number plate of a moving automobile.

Figure 1A:
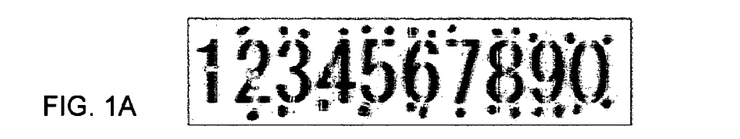
FIGS. 1A to 1D are images showing an image recognition method according to a first embodiment of the present invention.

However, in this method, there is a case that accurate recognition results can not be obtained when the original image includes some noises and/or blur. In particular, when a quality of the original image is relatively low, for example, the original image includes some characters such as numerical characters, each of which is composed of a plurality of elements, and/or undesired dots around the characters in the background, as shown in FIG. 1A, there is a fear that time needed to recognize the characters considerably increases despite a decrease in recognition accuracy.

SUMMARY OF THE INVENTION

Therefore, a concern of the present invention is to provide an image recognition method including the capability of efficiently recognizing characters such as letters, numerical characters and symbols included in an original image with accuracy even when at least one of the characters included in the original image is composed of a plurality of elements.

That is, the image recognition method of the present invention comprises the steps of:
(I) taking a first image including a character composed of plural elements;
(II) extracting the plural elements in the first image to obtain a second image, in which each of the plural elements is enclosed by a rectangular frame;
(III) forming a composite image with respect to a combination of the rectangular frames in the second image;
(IV) calculating a characteristic amount of the elements included in the composite image;
(V) inputting the characteristic amount in a back-propagation network, in which learning about a reference character(s) to be included in the first image has already finished, to provide a degree of agreement between the characteristic amount of the composite image and the reference character; and
(VI) determining the composite image having a highest degree of agreement between the characteristic amount of the composite image and the reference character from the results obtained by repeating the steps (III) to (V) with respect to different combinations of the rectangular frames in the second image, to output it as a recognition data.

In the above image recognition method, it is preferred to carry out a pretreatment described below when the first image includes at least two characters coupled to each other. That is, this pretreatment comprises the steps of:
preparing a binary image including the at least two characters;
determining a profile showing a distribution strength in an alignment direction of the at least two characters from the binary image;
setting a threshold line having a predetermined distribution strength in the profile;
removing a first region of the profile, where the distribution strength is lower than the threshold line, from the profile to obtain a compensated image, in which the at least two characters are separated from each other; and
using the compensated image as the first image.

In particular, it is preferred that the pretreatment described above comprises the steps of:
after removing the first region from the profile, dividing the first region into two areas at a position having a minimum distribution strength of the profile within the first region; and
adding the two areas respectively into a pair of second regions of the profile located at both sides of the first region, where the distribution strength is greater than the threshold line, to obtain the compensated image.

In addition, in the above image recognition method, it is preferred to carry out a pretreatment described below when the first image includes a character composed of a plurality of dots. That is, this pretreatment comprises the steps of:
preparing a binary image including the character of the dots;
expanding each of the dots of the character in a horizontal direction in the binary image to obtain a compensated image, in which each of expanded dots are joined with an adjacent expanded dot; and
using the compensated image as the first image.

In particular, it is preferred that this pretreatment comprises the steps of:
preparing a binary image including the character of the dots;
expanding each of the dots of the character in horizontal and vertical directions in the binary image to obtain a compensated image, in which each of expanded dots are joined with an adjacent expanded dot; and
using the compensated image as the first image.

Another concern of the present invention is to provide an image recognition apparatus including the capability of achieving the remarkable effects of the above-described image recognition method.

The image recognition apparatus of the present invention comprises:
an image pickup device for taking a first image;
an image-element divider for extracting a plurality of elements constructing a character included in the first image to obtain a second image, in which each of the elements is enclosed by a rectangular frame;
a composite-image generator for forming a composite image with respect to a combination of the rectangular frames in the second image;
a characteristic-amount calculator for determining a characteristic amount of the elements included in-the composite image;
a back-propagation network, in which learning about a reference character(s) to be included in the first image has already finished, for providing a degree of agreement between the characteristic amount of the composite image and the reference character when the characteristic amount is input into the back-propagation network; and an image analyzer for determining the composite image having a highest degree of agreement between the characteristic amount of the composite image and the reference character from results provided by the back-propagation network with respect to different combinations of the rectangular frames in the second image, to output it as a recognition data.

These and still other objects and advantages of the present invention will become apparent from the best mode for carrying out the invention explained below referring to the attached drawings.

BEST MODE FOR CARRYING OUT THE INVENTION

First Embodiment

As a preferred embodiment of the image recognition method of the present invention, a method of efficiently recognizing an arrangement of numerical characters with accuracy from an original image shown in FIG. 1A, which is obtained by use of an image pick-up unit such as a TV camera or a digital camera, is explained in detail below.

In the original image of FIG. 1A, for example, the numerical character "1" is composed of upper and lower elements (11, 12) because a center portion of the numerical character "1" has been lost. Similarly, the numerical character "2" is composed of four elements (21, 22, 23, 24), and there are undesired dots (25, 26) as noises at upper and lower sides of the numerical character "2".

Figure 1B:
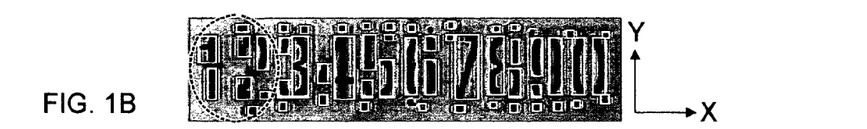
Figure 2:
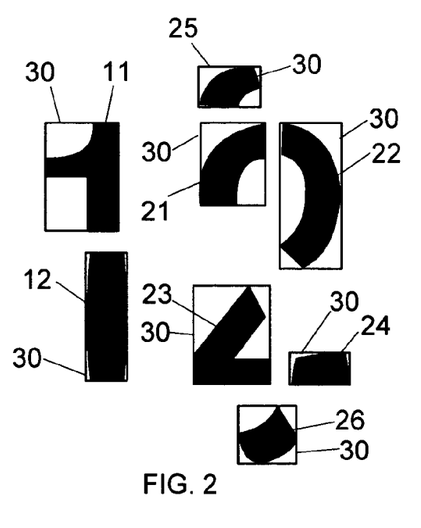
FIG. 2 is a schematic diagram illustrating arrangements of rectangular inner frames in a dotted circle of FIG. 1B.

In the image recognition method of this embodiment, each of the elements included in the original image, that is, each of the elements (11, 12, 21, 22, ...) constructing the respective numerical characters ("1", "2", ...) and the undesired dots (25, 26, ...) included as the noises in the original image, is extracted, and then enclosed by a rectangular inner frame 30 to obtain a second image shown in FIGS. 1B and 2. That is, in the second image, each of the rectangular frames 30 is arranged so as to circumscribe the respective element or dot. The second image can be obtained by a frame distributing unit for extracting the plurality of elements constructing the character in the original image and arranging the rectangular inner frames 30 such that each of the rectangular inner frames circumscribes the respective element.

Figure 3A:
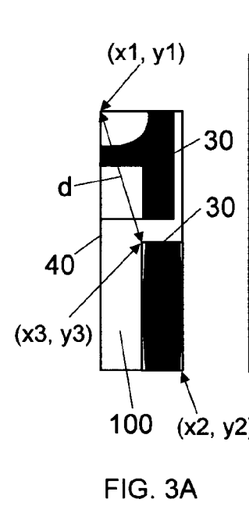
FIGS. 3A and 3B are schematic diagrams illustrating examples of rectangular outer frames.
Figure 3B:
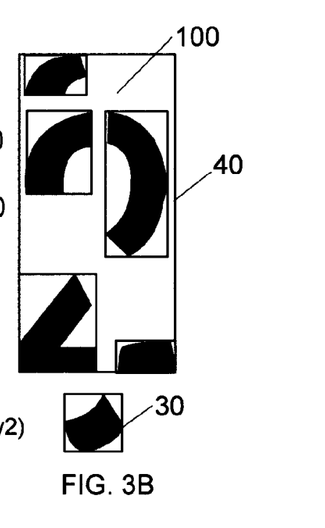

Next, a combination of the rectangular inner frames 30 in the second image is voluntarily selected, and a first composite image 100 is prepared by a frame synthesizer according to this combination. For example, the first composite image 100 can be prepared with respect to two rectangular frames 30 enclosing the elements 11, 12 of the numerical character "1" therein, as shown in FIG. 3A, and another first composite image 100 can be prepared with respect to five rectangular frames 30 enclosing the elements 21 to 24 of the numerical character "2" and the undesired dot 24 therein, as shown in FIG. 3B. Thus, this first composite image 100 is defined by a rectangular outer frame 40, which circumscribes a plurality of the rectangular inner frames 30. In the second image, the X-axis is defined in a direction of arrangement of the numerical characters, and the Y-axis is defined in a height direction of the numerical characters.

Next, an area of the rectangular outer frame 40 of this first composite image 100 is calculated. For example, as shown in FIG. 3A, the area of the rectangular outer frame 40 can be easily calculated according to coordinates of the upper left corner (x1, y1) and the lower right corner (x2, y2) of the rectangular outer frame. Then, the calculated area of the rectangular outer frame 40 is compared with a required value previously stored in a back propagation network, for example, 2 times an average of widths of numerical characters stored in the back propagation network. When the area is equal to or smaller than the required value, the image recognition method proceeds to the next step. On the other hand, when the area is larger than the required value, the first composite image is deleted, and another combination of the rectangular inner frames 30 in the second image is selected to generate another first composite image 100. The area of the rectangular outer frame of another first composite image is checked according to the above-described manner. In this embodiment, this step is called as an area check step (I).

After the area check step (I), a distance between the rectangular inner frames in the first composite image is calculated. For example, as shown in FIG. 3, this distance d can be easily determined according to coordinates of the upper left corners (x1, y1), (x3, y3) of the two rectangular inner frames 30. Then, the calculated distance is compared with a required value previously stored in the back propagation network, for example, 40% of an average of gap widths of the numerical characters stored in the back propagation network. When the distance is equal to or smaller than the required value, the image recognition method proceeds to the next step. On the other hand, when the distance is larger than the required value, the first composite image 100 is deleted, and another combination of the rectangular inner frames in the second image is selected to generate another first composite image. The distance between the rectangular inner frames in another first composite image is checked according to the above-described manner. In this embodiment, this step is called as a distance check step (I).

After the distance check step (I), the area of the rectangular outer frame 40 of the first composite image 100 is compared with a required value previously stored in the back propagation network, for example, a half of an average of widths of numerical characters_stored in the back propagation network. When the area is equal to or larger than the required value, the image recognition method proceeds to the next step. On the other hand, when the area is smaller than the required value, another rectangular inner frame in the second image is selected, and added to the first composite image, so that another first composite image having an increased area is generated. An area of the rectangular outer frame 100 of another first composite image is checked according to the above-described manner. Thus, by repeating this procedure until the above condition is satisfied, a plurality of rectangular inner frames can be enclosed in a single rectangular outer frame, as shown in FIG. 3B. In this embodiment, this step is called as an area check step (II).

Figure 1C:
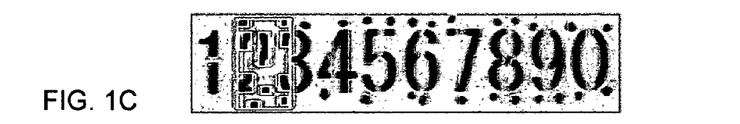
Figure 4:
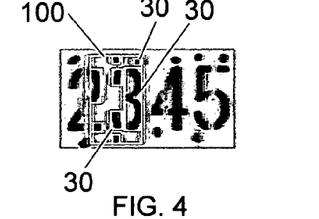
FIG. 4 is an image showing an example of a first composite image provided via an area check step (II)

As shown in FIG. 1C, the first composite image 100 provided via the area check step (II) is stored as a reliable candidate image in a memory. An example of the first composite image 100 provided via the area check step (II) is shown in FIG. 4. In this figure, although a plurality of the elements and the dots are included in the first composite image 100, it should be noted that all of the elements constructing the numerical character "3" are included in the first composite image 100. However, there is a case that all of the elements constructing the numerical character are not included in the first composite image. Therefore, if such a useless first composite image can be found and deleted prior to the subsequent important steps of the image recognition method of the present invention, it is possible to reduce a total number of the first composite images in order to more efficiently carry out the image recognition. Therefore, a second stage of the image recognition method of this embodiment is an optional stage for achieving this purpose, i.e., "data reduction". Therefore, the second stage may be omitted, if necessary.

Figure 5:
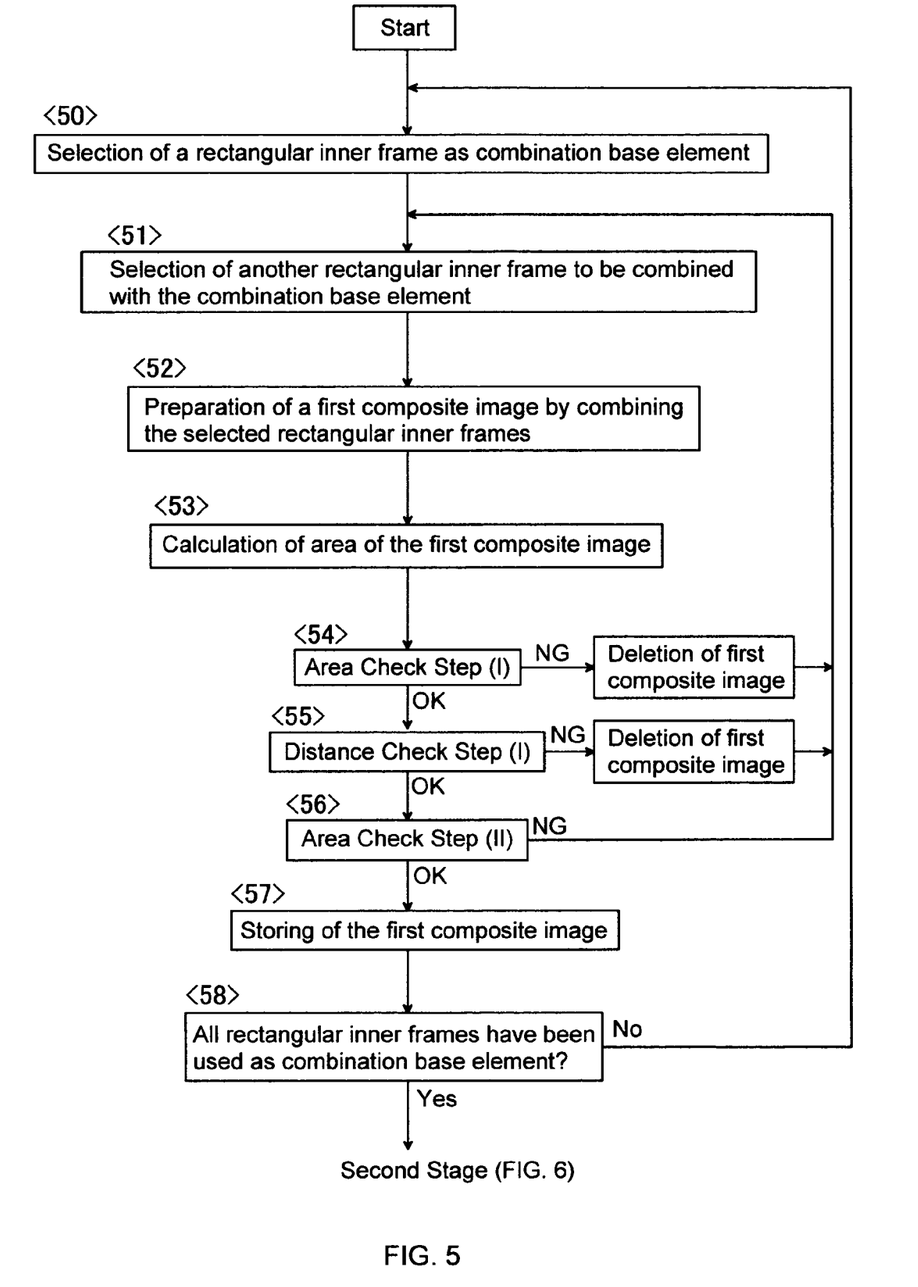
FIG. 5 is a flow chart of a first stage of the image recognition method of the first embodiment.

Prior to the explanation of the second stage, the first stage explained above of the image recognition method of this embodiment is summarized according to a flow chart shown in FIG. 5. That is, each of the rectangular inner frames 30 that circumscribes the respective element or dot in the second image is selected as a combination base element in order (step 50). In addition, another rectangular inner frame 30 to be combined with the combination base element is selected (step 51), to thereby prepare the first composite image 100 having the rectangular outer frame 40 that circumscribes those selected rectangular inner frames 30 (step 52).

Then, the area of the rectangular outer frame 40 of the first composite image 100 is calculated (step 53), and the area-check step (I), the distance-check step (I) and the area-check step (II) are performed in order (steps 54-56). When the first composite image 100 is regarded as "No Good (NG)" in either the area-check step (I) or the distance-check step (I), it is deleted, and a new rectangular inner frame to be combined with the rectangular inner frame of the combination base element is selected (step 51), to thereby generate another first composite image. On the other hand, when the first composite image 100 is regarded as "No Good (NG)" in the area-check step (II), an additional rectangular inner frame 30 is selected and added to the first composite image 100 to increase the total area thereof. Therefore, even if the first composite image 100 is regarded as "NG" in the area-check step (II), it is not deleted.

As described above, the first composite image 100 (e.g., FIG. 4) provided via all of the area-check step (I), the distance-check step (I) and the area-check step (II) is stored as the reliable candidate image in the memory (step 57). By the way, when the first composite image 100 is stored as the reliable data in the memory, a next first composite image is prepared by combining another rectangular inner frame selected as a new combination base element with at least one of the remaining rectangular inner frames other than the rectangular inner frame(s) that has already used as the combination base element. According to this manner, when all of the rectangular inner frames in the second image are used as the combination base element (step 58), the image recognition method of the present invention proceeds to the second stage that is the data reduction treatment, as shown in a flow chart of FIG. 6.

Figure 6A:
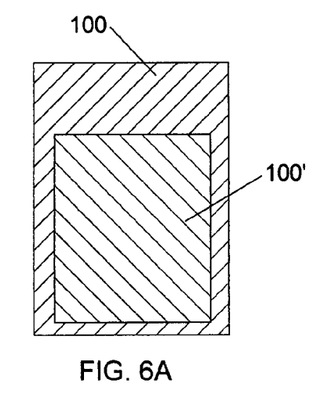
FIGS. 6A and 6B are schematic diagrams illustrating examples of a second stage of the image recognition method of the first embodiment.
Figure 7:
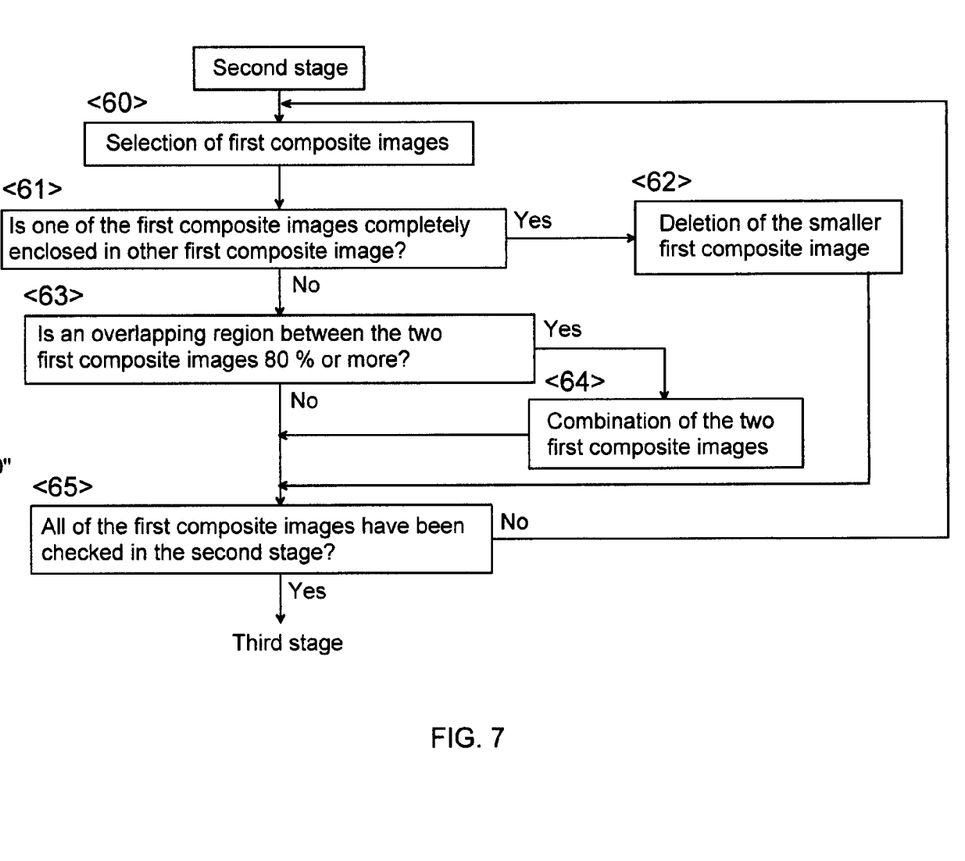
FIG. 7 is a flow chart of the second stage of the image recognition method.

The second stage of the image recognition method of this embodiment is a data reduction treatment of deleting overlapping first composite images to achieve an improvement in the recognition speed. That is, as shown in the flow chart of FIG. 7, one of the first composite images stored in the memory is selected, and another first composite image to be compared with the selected one of the first composite image (step 60), so that a comparison therebetween is performed. For example, as shown in FIG. 6A, when the first composite image 100' is completely enclosed in the other first composite image 100 (step 60), the first composite image 100' is deleted (step 62).

Figure 6B:
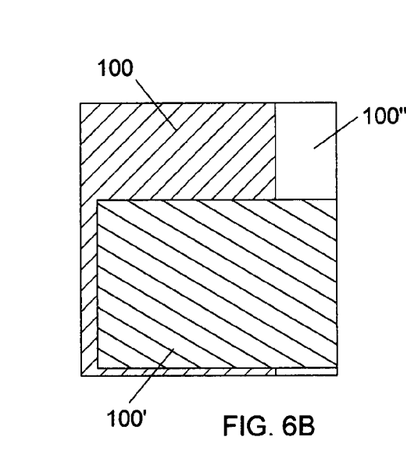

On the other hand, as shown in FIG. 6B, when the first composite image 100 is partially overlapped with the other first composite image 100', an overlapping area between those first composite images (100, 100') is calculated. When the overlapping area is 80% or more of one of the first composite images (step 63), the first composite images (100, 100') are coupled to each other to generate a new first composite image 100" (step 64). When the overlapping area is less than 80%, each of the first composite images is maintained on one's own without being coupled with the other first composite image. When all of the first composite images in the memory have been checked in the second stage (step 65), the image recognition method of this embodiment proceeds to the third stage.

Figure 8:
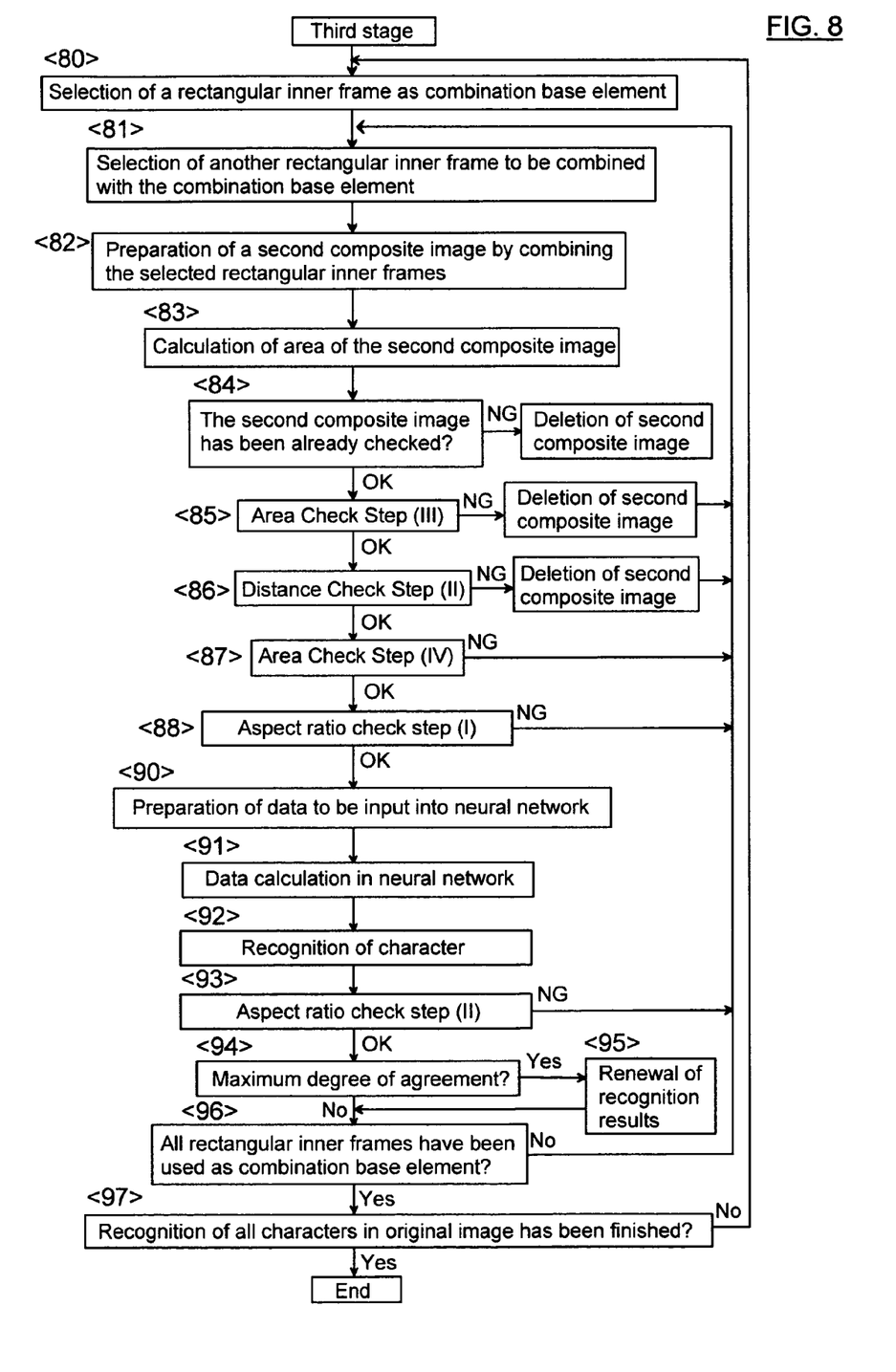
FIG. 8 is a flow chart of a third stage of the image recognition method of the first embodiment.

In the third stage of the image recognition method, as shown in a flow chart of FIG. 8, steps similar to the area check step (I), the distance check step (I) and the area check step (II) of the first stage are substantially repeated with respect to a plurality of the rectangular inner frames 30 included in the rectangular outer frame 40 of the first composite image 100 provided from the second stage. In other words, the first stage is to determine a coarse (wide) region (=first composite image) including the elements of the numerical character to be recognized, and on the contrary the third stage is to determine a fine (narrow) region (=second composite image described later)) substantially including only the elements of the numerical character to be recognized, and achieve the image recognition according to the second composite image.

Figures 9, 10A:
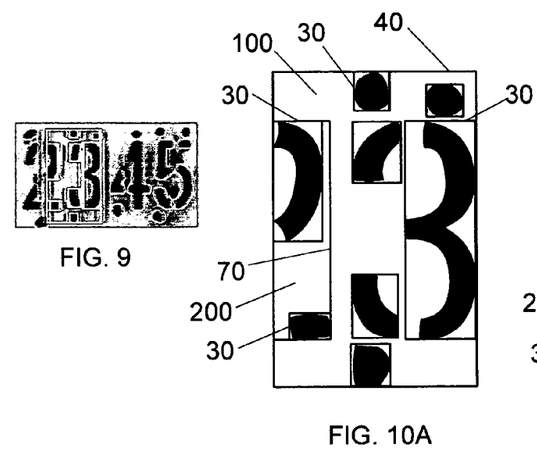
FIG. 9 is an image showing an example of the first composite image provided via the second stage of the image recognition method.
FIGS. 10A and 10B are schematic diagrams illustrating examples of second composite images.

In the third stage, as shown in FIGS. 9 and 10A, a combination of the rectangular inner frames 30 in the first composite image 100 is voluntarily selected, and a second composite image 200 is prepared according to this combination by the substantially same manner as the first stage. This second composite image 200 is defined by a rectangular outer frame 70, which circumscribes the selected rectangular inner frames 30.

Next, with respect to this second composite image 200, an area of the rectangular outer frame 70 is calculated, for example by the substantially same manner as the first stage. The calculated area of the rectangular outer frame 70 is compared with a required value previously stored in the back propagation network, for example, 1.2 times an average of widths of the numerical characters stored in the back propagation network. In the third stage, this comparison is performed under a more severe condition than the first stage (e.g., 2 times the average of widths of the numerical characters stored in the back propagation network). When the area is equal to or smaller than the required value, the image recognition method proceeds to the next step of the third stage. On the other hand, when the area is larger than the required value, the second composite image is deleted, and another combination of the rectangular inner frames 30 in the first composite image 100 is selected to generate another second composite image 200. The area of the rectangular outer frame 70 of another second composite image is checked according to the above-described manner. In this embodiment, this step is called as an area check step (III).

After the area check step (III), a distance between the rectangular inner frames 30 in the second composite image 200 is calculated, for example, by the substantially same manner as the first stage. Then, the calculated distance is compared with a required value previously stored in the back propagation network, for example, 40% of an average of gap widths of the numerical characters stored in the back propagation network. When the distance is equal to or smaller than the required value, the image recognition method proceeds to the next step of the third image. On the other hand, when the distance is larger than the required value, the second composite image 200 is deleted, and another combination of the rectangular inner frames 30 in the first composite image 100 is selected to generate another second composite image 200. The distance between the rectangular inner frames 30 in another second composite image 200 is checked according to the above-described manner. In this embodiment, this step is called as a distance check step (II).

Figure 10B:
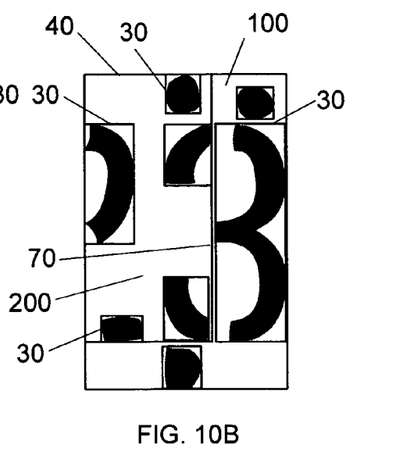

After the distance check step (II), the area of the rectangular outer frame 70 of this second composite image 200 is compared with a required value previously stored in the back propagation network, for example, 0.8 times an average of widths of the numerical characters stored in the back propagation network. In the third stage, the comparison is performed under a more severe condition than the first stage (e.g., a half of an average of widths of the numerical characters stored in the back propagation network). When the area is equal to or larger than the required value, the image recognition method of the present invention proceeds to the next step of the third stage. On the other hand, when the area is smaller than the required value, another rectangular inner frame 30 in the first composite image 100 is selected, and added to the second composite image, so that a new second composite image having an increased area is generated. An area of the rectangular outer frame 70 of the new second composite image 200 is checked according to the above-described manner. Thus, by repeating this procedure until the above condition is satisfied, a plurality of rectangular inner frames 30 in the first composite image 100 can be enclosed in a single rectangular outer frame 70 of the second composite image 200, as shown in FIG. 10B. In this embodiment, this step is called an area check step (IV).

The flow chart diagram shown in FIG. 8 summarizes the third stage of the image recognition method of this embodiment so far. That is, each of the rectangular inner frames 30 enclosing the elements or dots in the first composite image 100 is selected as a combination base element in order (step 80). In addition, another rectangular inner frame 30 to be combined with the rectangular inner frame of the combination base element is selected (step 81), to thereby obtain the second composite image 200 having the rectangular outer frame 70 that circumscribes those selected rectangular inner frames 30 (step 82), as shown in FIG. 10A.

Then, the area of the rectangular outer frame 70 of the second composite image 200 is calculated (step 83), and the area-check step (III), the distance-check step (II) and the area-check step (IV) are carried out in order (steps 85-87). When the second composite image 200 is regarded as "No Good (NG)" in either the area-check step (III) or the distance-check step (II), it is deleted, and another rectangular inner frame 30 to be combined with the rectangular inner frame of the combination base element is selected (step 81), to thereby generate another second composite image 200 (step 82). On the other hand, when the second composite image 200 is regarded as "No Good (NG)" in the area-check step (IV), an additional rectangular inner frame 30 is selected, and added to the second composite image regarded as "NG", so that a new second composite image 200 having an increased area is generated. Therefore, the second composite image regarded as "NG" in the are-check step (II) is not deleted. By the way, the third stage comprises a step 84 of checking as to whether the subsequent treatment(s), e.g., the area-check step (III) has been already performed to the second composite image 200. If yes, the second composite image is deleted to avoid unnecessarily repeating the same treatment.

Next, an aspect ratio, i.e., vertical width/horizontal width of the rectangular outer frame 70 of the second composite image 200 provided via the area-check step (IV) is calculated, and compared with a predetermined value stored in the back propagation network (step 88). In this embodiment, this step that is called as a aspect-ratio check step (I) is performed as to whether the aspect ration is within a range of 0.5 times to 1.5 times a minimum value of the aspect ratios of the numerical characters stored in the back propagation network. When the aspect ratio is within this range, the image recognition method proceeds to the next step of the third stage. When the aspect ratio is out of this range, the second composite image is deleted, and another rectangular inner frame 30 in the first composite image 100 is selected to generate a new second composite image 200.

Figure 11A:
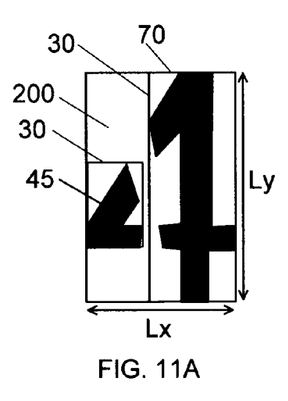
FIGS. 11A to 11F are schematic diagrams illustrating preparation of data for neural network from the second composite image.

Next, data to be input into the neural network is prepared (step 90) from the second composite image 200 regarded as "OK" in the aspect-ratio check step (I). First, the elements included in the second composite image 200 are extracted. In this embodiment, for example, as shown in FIG. 11A, the two elements constructing the numerical character "4" are extracted from the second composite image 200. Next, an image size of the extracted image is normalized. For example, the normalization is performed such that a longer one ("Ly" in FIG. 11A) of the X-axis and Y-axis lengths (Lx, Ly) of the extracted image is 40 pixels.

Figure 11B:
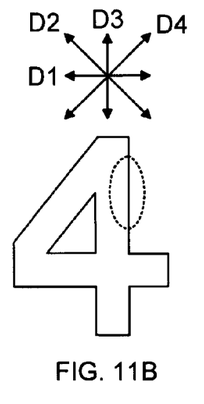
Figure 11C:
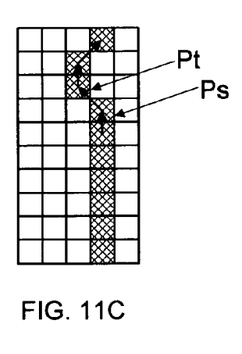
Figure 11D:
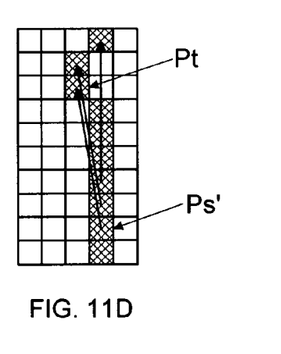

Next, with respect to each of the pixels on edge lines of the elements of the normalized image, an outline direction is calculated. In this embodiment, as shown in FIG. 11B, four outline directions (D1 to D4) are set. For example, in the region indicated by a circle in FIG. 11B, when the outline direction of a target pixel Pt is defined as a direction of a straight line extending between the target pixel Pt and a reference pixel Ps positioned backward from the target pixel Pt by only 1 pixel, it is regarded that the target pixel Pt has the outline direction D2 that is an oblique direction. However, this result disaccords with the fact that a correct outline direction of the target pixel Pt should be regarded as D3. In this embodiment, since the outline direction of the target pixel Pt is defined as a direction of a straight line extending between the target pixel Pt and a reference pixel Ps' positioned backward from the target pixel by 6 pixels, it is regarded that the target pixel Pt has the outline direction D3 that is a vertical direction. This result accords with the fact that the correct outline direction is D3, as described above.

Figure 11E:
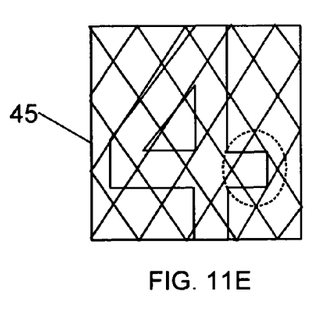
Figure 11F:
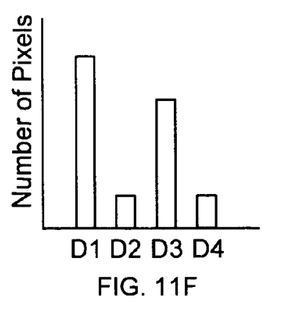

Next, as shown in FIG. 11E, a grid pattern 45 is placed such that the elements of the normalized image are included therein. In this embodiment, this grid pattern 45 is configured in a square shape of 40×40 pixels. The number of grids of the grid pattern 45 is 36. With respect to the pixels on the edge line included in each of the grids, a histogram of the outline directions is prepared, as shown in FIG. 11F. After a treatment of dividing a height of each of the outline directions by the maximum height of the outline direction is performed with respect to each of the histograms, resultant data are input in the neural network (step 91). In this embodiment, input dimensions of the neural network are 144, which is obtained by multiplying the number of outline directions (=4 dimensions) by the number of grids (=36 dimensions). The calculation of the neural network presents a recognition result the numerical character included in the second composite image 200 is "4" (step 92).

Figure 12:
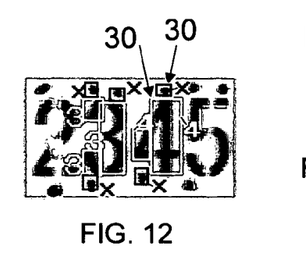
FIG. 12 is an image showing an example of recognition results of the image recognizing method of this embodiment.

To obtain the recognition result with the highest accuracy, the aspect ratio of the recognized numerical character (for example, "4") is calculated, and compared with a reference aspect ratio (for example, the reference aspect ratio of "4") stored in the back propagation network to check a degree of agreement therebetween (step 93). In this embodiment, this is called as an aspect-ratio check step (II). When a recognition result with a degree of agreement therebetween is obtained, it is temporarily stored in the memory. Subsequently, if a new recognition result having a higher degree of agreement therebetween is obtained, the data is renewed (steps 94 and 95). By repeating this procedure, the recognition result having the highest degree of agreement therebetween can be obtained. In this embodiment, for example, as shown in FIG. 12, the combination of the two elements designated by the numeral 4 has a higher degree of agreement of the aspect ratio than any combination including the dot(s) designated "X". Therefore, the combination of the rectangular inner frames 30 with the highest degree of agreement is output as a correct combination of the elements constructing the numerical character "4".

Figure 1D:
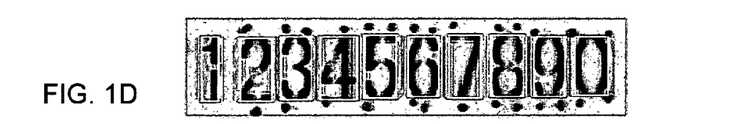

The step 96 of the third stage is to check as to whether all of the rectangular inner frames 30 in the first composite image 100 provided from the second stage have been used as the combination base element in the third stage. If yes, the image recognition method of this embodiment proceeds to the next step 97, which is to check as to whether the recognition of all of the numerical characters in the original image of FIG. 1A has been finished. As a result, as shown in FIG. 1D, the image recognition method of the present invention can provide an image including the rectangular outer frames 70 of the second composite images 200, in each of which only the elements constructing the numerical character are enclosed.

By the way, in this embodiment, the characteristic amounts such as area, distance and aspect ratio can be determined by characteristic amount calculating units. In addition, the degree of agreement of the characteristic amount can be determined by an image analyzer. Therefore, the present embodiment also provides an image recognition apparatus or system for realizing the image recognition method described above.

Second Embodiment

Figure 13A:
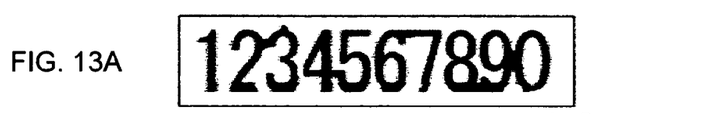
FIGS. 13A to 13E are images showing a pretreatment performed prior to the image recognition method according to a second embodiment of the present invention.

This embodiment presents a pretreatment that is preferably performed prior to the image recognition method of the first embodiment, for example, when an original image to be recognized includes an arrangement of numerical characters, in which adjacent numerical characters are partially coupled to each other, as shown in FIG. 13A, because the original image is prepared under a bad condition. Therefore, a duplicate explanation of the image recognition method of the first embodiment performed after the pretreatment is omitted.

Figure 13B:
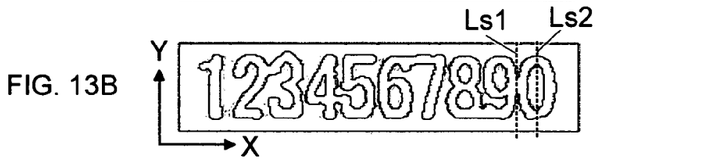
Figure 13C:
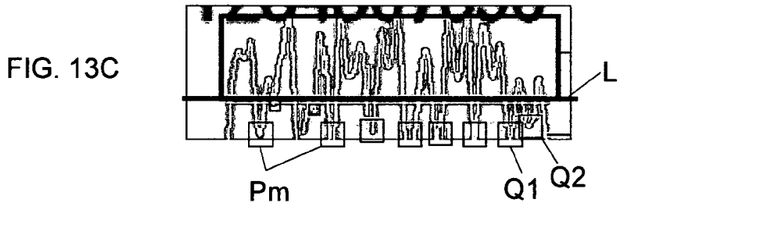
Figure 13D:
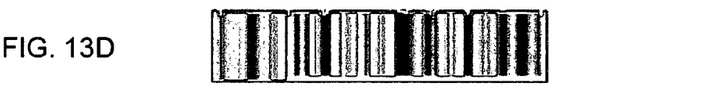

First, as shown in FIG. 13B, a binary image of the original image of FIG. 13A is prepared. Then, a profile indicative of distribution strength in an alignment direction (x-axis direction) of the numerical characters from the binary image is determined, as shown in FIG. 13C. FIG. 13D is a top view of the profile of FIG. 13C, in which each of bright regions designates a high distribution strength of the numerical character. As the region becomes dark, it means that the distribution strength of the numerical character is smaller, or zero (=the region between adjacent numerical characters).

As an example, a method of determining the profile is introduced. First, the numerical character regions in the binary image (FIG. 13B) are projected on an axis that called as a projection axis (=x axis), extending parallel to the alignment direction of the numerical characters. In this projection treatment, scanning is performed in a direction (Y-axis) perpendicular to the projection axis to count the number of pixels on the scanning line. For example, as shown in FIG. 13B, when the pixels of white regions indicative of the numerical characters provide a concentration value "1", and the pixels of black regions indicative of the background provide a concentration value "0", the number of pixels having the concentration value "1" is counted. By determining, as a projection value, the number of pixels with the concentration value "1" on the scanning line extending from each point of the projection axis, the profile of distribution strength can be obtained, as shown in FIG. 13C.

By the way, when adjacent numerical characters (e.g., "9" and "0") are coupled to each other by a relatively large area, as shown in FIG. 13B, it is needed to distinguish the white region of the coupling region from the white regions constructing the numerical character. In this method, by multiplexing the projection value by the number of island regions on the scanning line, in each of which the pixels having the concentration value "1" are successively arranged, it is possible to distinguish the pixels having the concentration value "1" of the numerical character from the pixels having the concentration value "1" of the coupling region. For example, in FIG. 13B, the number of pixels "1" on the scanning line Ls1 passing the coupling region is approximately equal to the number of pixels "1" on the scanning line Ls2 passing the numerical character "0". However, by performing the multiplexing treatment described above, the distribution strength at the scanning line Ls1 becomes lower than the distribution strength at the scanning line Ls2, as shown by square regions "Q1", "Q2" in FIG. 13C.

Figure 13E:
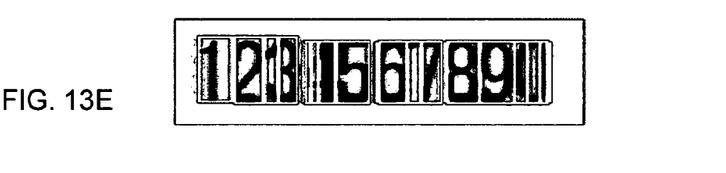

Next, as shown in FIG. 13C, a threshold line L having a predetermined distribution strength is set in the profile. For example, when a lower region S2 of the profile where the distribution strength is lower than the threshold line L, is positioned between a pair of upper regions (S1L, S1R) of the profile where the distribution strength is greater than the threshold line L, the lower region S2 is divided into the two areas (S2L, S2R) at a position "Pm" having a minimum distribution strength of the profile within the lower region. FIG. 13E is a bottom view of the profile of FIG. 13C, in which each of white lines extending in the Y-axis direction designates the position "Pm" of the minimum distribution strength in the respective lower region S2 of the profile.

Figure 14A:
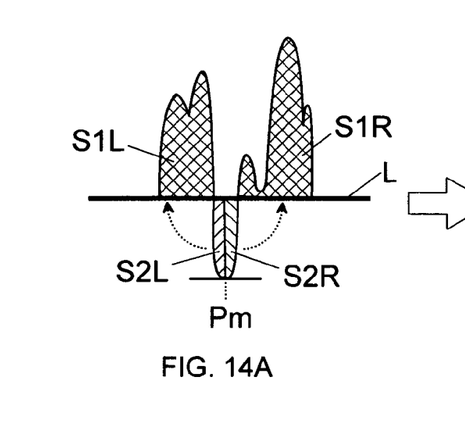
FIGS. 14A and 14B are schematic diagrams illustrating this pretreatment.
Figure 14B:
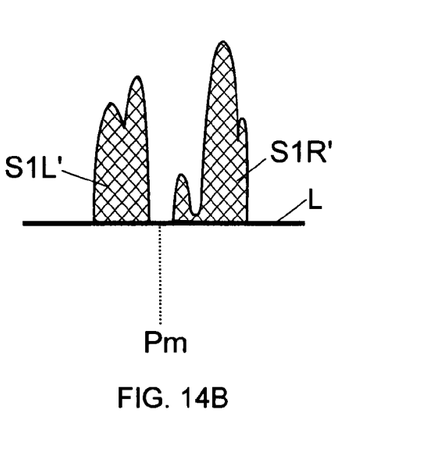

As shown in FIGS. 14A and 14B, these area (S2L, S2R) are removed from the profile, and then respectively added to the adjacent upper regions (S1L, S1R), so that the upper region S1L' is separated from the adjacent upper region S1R'. Thus, a compensated image is obtained, in which the adjacent numerical characters of the original image are separated from each other. By carrying out the image recognition method of the first embodiment to this compensated image, the rectangular inner frames can be placed such that each of the rectangular frames encloses therein a single numerical character. Therefore, it is possible to avoid the occurrence of an inconvenience that the adjacent numerical characters coupled to each other are enclosed in a single rectangular frame, which may be a cause of lowering the recognition accuracy.

The threshold line L can be determined as follows. That is, an upper region of the profile is firstly extracted in the case that the threshold line is set to a position "0". Then, an aspect ratio of this upper region is compared with a predetermined value, for example, an average aspect ratio of the numerical characters previously stored in the back propagation network. When the aspect ratio of the upper region is larger than the average aspect ratio, the threshold line is used. However, if this condition is not satisfied, the above procedures are repeated by changing the position of the threshold line to determine the threshold line satisfying the above condition. As a modification, an average width in the horizontal direction of the characters may be used in place of the average aspect ratio.

Figure 15:
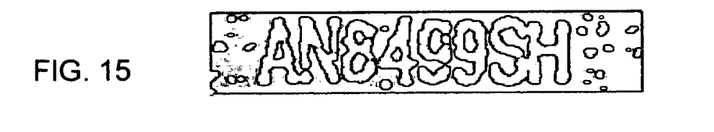
FIG. 15 is an original image having a poor quality.

Thus, according to the image recognition method of the present invention with the pretreatment of the second embodiment, it is possible to efficiently recognize the characters such as numerical characters and letters with accuracy even from a bad-quality original image, for example, as shown in FIG. 15, in which some of the characters are divided into plural elements (e.g., "8" and "9"), undesired dots exist around the characters, and some of the characters are coupled to each other (e.g., "S" and "H").

Third Embodiment

Figure 16A:
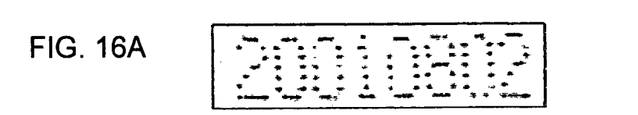
FIGS. 16A to 16D are images showing a pretreatment performed prior to the image recognition method according to a third embodiment of the present invention.

This embodiment presents a pretreatment that is preferably performed prior to the image recognition method of the first embodiment, for example, when an original image to be recognized includes an arrangement of characters such as numerical characters and letters, each of which is composed of a plurality of dots, as shown in FIG. 16A. Therefore, a duplicate explanation of the image recognition method of the first embodiment performed after the pretreatment is omitted.

Figure 16B:
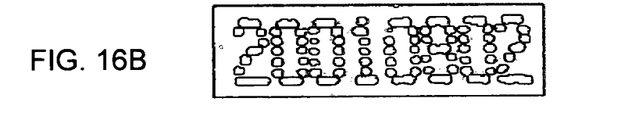
Figure 16C:
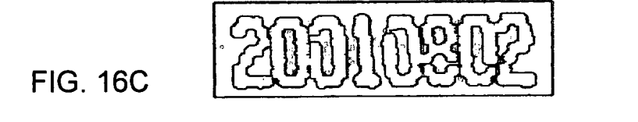

In this pretreatment, as shown in FIG. 16B, a binary image of the original image of FIG. 16A is firstly prepared. Then, each of the dots of the characters is expanded in two directions, i.e., horizontal and vertical directions of the binary image to obtain a compensated image, as shown in FIG. 16C, in which each of the expanded dots are joined with an adjacent expanded dot. This expansion treatment can be performed by replacing pixels having the value of "0" around the respective dot with the pixels having the value of "1" in the designated direction of the binary image. In the thus obtained compensated image, each of the characters is composed of a single element.

Figure 16D:
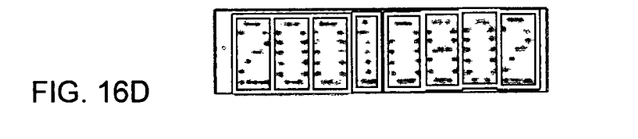

When the image recognition method of the present invention is performed to the original image of FIG. 16A, there is a fear that time needed for the image recognition is extended because the rectangular inner frame is arranged with respect to each of the dots of the characters, so that the total number of the rectangular inner frames considerably increases. In addition, this may become a cause of deterioration in the recognition accuracy. However, when the image recognition method of the present invention is performed to the compensated image of FIG. 16C, the total number of rectangular inner frames to be arranged can be remarkably reduced, as shown in FIG. 16D. Therefore, it is possible to achieve an improvement in recognition accuracy and a time saving for the image recognition. By the way, there is a case that adjacent characters are coupled to each other in this compensated image. In such a case, the pretreatment explained in the second embodiment may be performed to the compensated image of FIG. 16C.

Fourth Embodiment

Figure 17A:
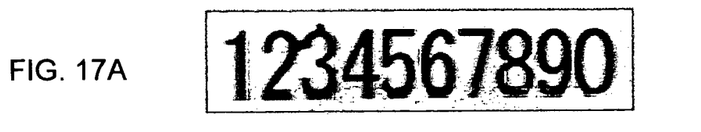
FIGS. 17A to 17D are images showing a pretreatment performed prior to the image recognition method according to a third embodiment of the present invention.
Figure 17B:
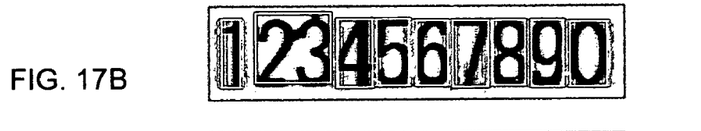

This embodiment presents a pretreatment that is preferably performed prior to the image recognition method of the first embodiment, for example, when an coupling area between adjacent characters in an original image, as shown in FIG. 17A, is much larger than the case of the original image of FIG. 13A, so that a sufficient recognition accuracy may not be obtained by the pretreatment of the second embodiment. Therefore, a duplicate explanation of the image recognition method of the first embodiment performed after the pretreatment is omitted.

Figure 17C:
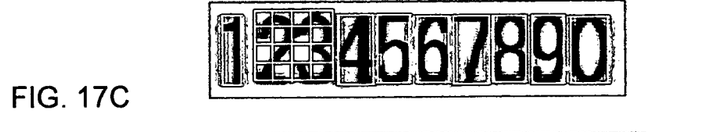

In this embodiment, when rectangular inner frames are arranged in an original image shown in FIG. 17A, two adjacent characters ("2" and "3" in FIG. 17A) coupled to each other are enclosed in a single large rectangular inner frame. Then, this large rectangular inner frame is forcedly divided into a plurality of regions each having a predetermined area to obtain a compensated image. For example, the large rectangular inner frame is divided into a plurality of small rectangular inner frames such that each of the small rectangular inner frames has a side that is substantially equal to a half of the minimum width in the horizontal and vertical directions of the characters previously stored in the back propagation network. In FIG. 17C, the single large rectangular inner frame is divided into 16 (=4×4) small rectangular inner frames.

Figure 17D:
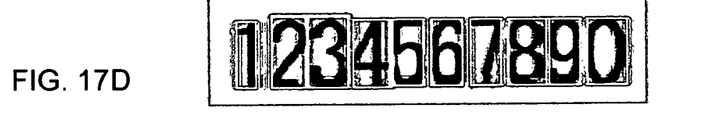

By carrying out the image recognition method of the first embodiment to the obtained compensated image, it is possible to efficiently recognize the characters such as numerical characters and letters with accuracy, as shown in FIG. 17D, even from a bad-quality original image (e.g., FIG. 17A), in which the coupling area between the adjacent characters are relatively large. By the way, when the area of the large rectangular inner frame is smaller than a predetermined value, for example, 1.2 times an average area of the characters previously stored in the back propagation network, it is preferred to carry out the image recognition treatment of the present invention without this pretreatment.

INDUSTRIAL APPLICABILITY

According to the present invention, even when an original image can not be accurately recognized by a conventional binarization or projection treatment because the original image includes characters such as letters and numerical characters each composed of a plurality of elements, or undesired dots around the characters, it is possible to provide a reliable image recognition method. In addition, there is an advantage of eliminating a problem that the accuracy of image recognition lowers, for example, when the characters to be recognized has an underline, or it is difficult to separate the characters from the background because the printing surface is a satin finished surface. Moreover, there is a further advantage of improving an inconvenience that recognition results with accuracy can not be efficiently obtained with recognition accuracy when the original image includes some noises in the background and/or characters each composed of a plurality of dots, e.g., letters printed by an ink-jet printer.

Thus, since the image recognition method of the present invention can efficiently recognize the characters with accuracy even from an original image having a poor quality, its applications are widely expected.

The invention claimed is:

1. An image recognition method comprising: performing the following steps on at least one processor
    (I) taking a first image encompassing an entire character, the first image composed of plural elements having different shapes;
    (II) extracting said plural elements having different shapes in said first image to obtain a second image, in which each of said plural elements is enclosed by an inner rectangular frame and a shape of each inner rectangular frame is individually determined based upon a shape of the element the inner rectangular frame surrounds;
    (III) forming a composite image with respect to a combination of said inner rectangular frames in said second image;
    (IV) calculating a characteristic amount of said elements included in said composite image;
    (V) inputting said characteristic amount in a back-propagation network, in which learning about a reference character(s) to be included in said first image has already finished, to provide a degree of agreement between the characteristic amount of said composite image and the reference character; and
    (VI) determining said composite image having a highest degree of agreement between the characteristic amount of said composite image and the reference character from results obtained by repeating the steps (III) to (V) with respect to different combinations of said inner rectangular frames in said second image, to output it as a recognition data.

2. The image recognition method as set forth in claim 1 comprising a pretreatment performed when said first image includes at least two characters coupled to each other, wherein said pretreatment comprises the steps of:
    preparing a binary image including said at least two characters;
    determining a profile showing a distribution strength in an alignment direction of said at least two characters from said binary image;
    setting a threshold line having a predetermined distribution strength in the profile; removing a first region of said profile, where the distribution strength is lower than the threshold line, from said profile to obtain a compensated image, in which said at least two characters are separated from each other; and
    using the compensated image as said first image.

3. The image recognition method as set forth in claim 2, wherein said pretreatment comprises the steps of:
    after removing the first region from said profile, dividing the first region into two areas at a position having a minimum distribution strength of said profile within the first region; and
    adding said two areas respectively into a pair of second regions of said profile located at both sides of said first region, where the distribution strength is greater than the threshold line, to obtain said compensated image.

4. The image recognition method as set forth in claim 1 comprising a pretreatment performed when said first image includes a character composed of a plurality of dots, wherein said pretreatment comprises the steps of:
    preparing a binary image including said character of the dots;
    expanding each of the dots of said character in a horizontal direction in said binary image to obtain a compensated image, in which each of expanded dots are joined with an adjacent expanded dot; and
    using the compensated image as said first image.

5. The image recognition method as set forth in claim 1 comprising a pretreatment performed when said first image includes a character composed of a plurality of dots separated by gaps, wherein said pretreatment comprises the steps of:
    preparing a binary image including said character of the dots;
    expanding each of the dots of said character in horizontal and vertical directions in said binary image to obtain a compensated image, in which each of expanded dots are joined with an adjacent expanded dot thereby eliminating the gaps; and
    using the compensated image as said first image.

6. The image recognition method as set forth in claim 1, wherein said characteristic amount is an aspect ratio of said composite image.

7. The image recognition method set forth in claim 1, wherein the characteristic amount is an area.

8. An image recognition apparatus comprising:
    an image pickup device configured to take a first image;
    an image-element divider configured to extract a plurality of elements having different shapes constructing an entire character included in said first image to obtain a second image, in which each of said elements is enclosed by an inner rectangular frame with a shape individually correlated to a shape of the element surrounded by the inner rectangular frame;
    a composite-image generator for forming a composite image with respect to a combination of said inner rectangular frames in said second image;
    a characteristic-amount calculator for determining a characteristic amount of said elements included in said composite image;
    a back-propagation network, in which learning about a reference character(s) to be included in said first image has already finished, for providing a degree of agreement between the characteristic amount of said composite image and the reference character when the characteristic amount is input into said back-propagation network; and
    an image analyzer for determining said composite image having a highest degree of agreement between the characteristic amount of said composite image and the reference character from results provided by said back-propagation network with respect to different combinations of said inner rectangular frames in said second image, to output it as a recognition data.

9. An image recognition method comprising: performing the following steps on at least one processor
    (I) taking a first image including a character composed of plural elements;

(II) extracting said plural elements in said first image to obtain a second image, in which each of said plural elements is enclosed by an inner rectangular frame;

(III) forming a composite image with respect to a combination of said inner rectangular frames in said second image;

(IV) calculating an area of said elements included in said composite image;

(V) inputting said area in a back-propagation network, in which learning about a reference character(s) to be included in said first image has already finished, to provide a degree of agreement between the area of said composite image and the reference character; and (VI) determining said composite image having a highest degree of agreement between the area of said composite image and the reference character from results obtained by repeating the steps (III) to (V) with respect to different combinations of said inner rectangular frames in said second image, to output it as a recognition data; the method further comprising enclosing at least two of the inner rectangular frames with an outer rectangular frame;

comparing a calculated area of the outer rectangular frame with a required value previously stored in the back propagation network; and adding at least a third inner rectangular frame to the outer rectangular frame if the calculated area of the outer rectangular frame is less than the required value.

10. An image recognition method comprising: performing the following steps on at least one processor (I) taking a first image including a character composed of plural elements;

(II) extracting said plural elements in said first image to obtain a second image, in which each of said plural elements is enclosed by an inner rectangular frame;

(III) forming a composite image with respect to a combination of said inner rectangular frames in said second image;

(IV) calculating a characteristic amount of said elements included in said composite image;

(V) inputting said characteristic amount in a back-propagation network, in which learning about a reference character(s) to be included in said first image has already finished, to provide a degree of agreement between the characteristic amount of said composite image and the reference character; and (VI) determining said composite image having a highest degree of agreement between the characteristic amount of said composite image and the reference character from results obtained by repeating the steps (III) to (V) with respect to different combinations of said inner rectangular frames in said second image, to output it as a recognition data, wherein the combination of said inner rectangular frames in said second image is defined by surrounding at least two inner rectangular frames with an outer rectangular frame, a calculated area of said outer inner rectangular frame is compared with a required value previously stored in the back propagation network, at least a third inner rectangular frame is added to said outer rectangular frame to define another outer rectangular frame when the calculated area of said outer rectangular frame is less than the required value, and said another outer rectangular frame is stored as a candidate image for said composite image when said another outer rectangular frame is equal to or larger than the required value.

11. An image recognition apparatus comprising:

an image pickup device configured to take a first image;

an image-element divider configured to extract a plurality of elements constructing a character included in said first image to obtain a second image, in which each of said elements is enclosed by an inner rectangular frame;

a composite-image generator configured to form a composite image with respect to a combination of said inner rectangular frames in said second image;

a characteristic-amount calculator configured to determine a characteristic amount of said elements included in said composite image;

a back-propagation network, in which learning about a reference character(s) to be included in said first image has already finished, for providing a degree of agreement between the characteristic amount of said composite image and the reference character when the characteristic amount is input into said back-propagation network; and an image analyzer configured to determine said composite image having a highest degree of agreement between the characteristic amount of said composite image and the reference character from results provided by said back-propagation network with respect to different combinations of said inner rectangular inner frames in said second image, to output it as a recognition data, wherein said composite-image generator defines the combination of said rectangular frames in said second image by surrounding at least two rectangular frames with an outer rectangular frame, a calculated area of said outer rectangular frame is compared with a required value previously stored in the back propagation network, said composite-image generator defines another outer rectangular frame by adding at least a third rectangular frame to said outer rectangular frame when the calculated area of said outer rectangular frame is less than the required value, and said another outer rectangular frame is stored as a candidate image for said composite image in a memory when said another outer rectangular frame is equal to or larger than the required value.

\* \* \* \* \*